Feb. 18, 1947.  J. KATZ ET AL  2,415,824
MACHINE FOR MANUFACTURING FABRIC TUBING
Filed June 10, 1943
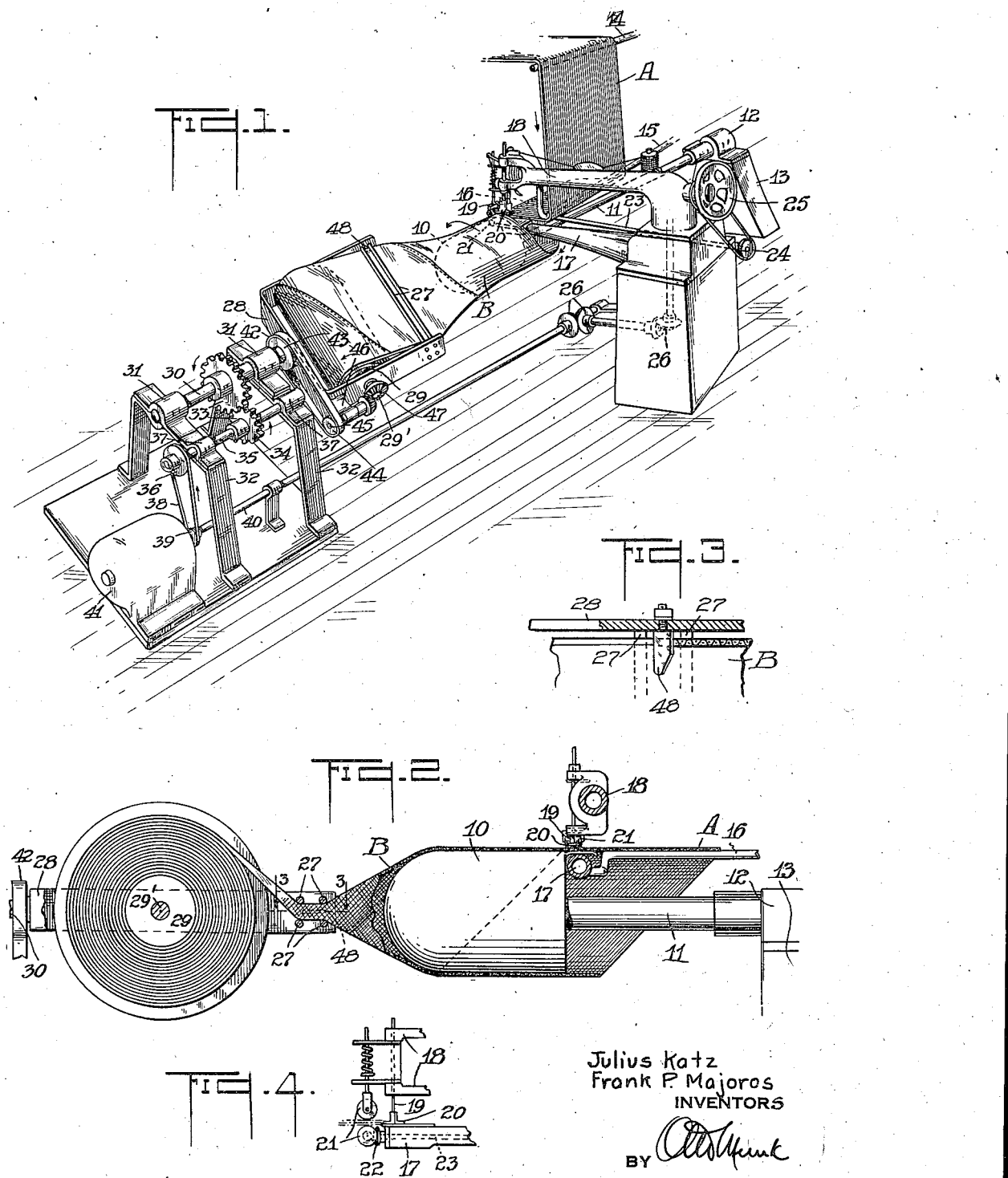
Julius Katz
Frank P. Majoros
INVENTORS
BY
THEIR ATTORNEY.

Patented Feb. 18, 1947

2,415,824

UNITED STATES PATENT OFFICE 2,415,824

MACHINE FOR MANUFACTURING FABRIC TUBING

Julius Katz, New York, and Frank P. Majoros, Brooklyn, N. Y., assignors to Superba Manufacturing Co., Inc., New York, N. Y., a corporation of New York Application June 10, 1943, Serial No. 490,262

5 Claims. (Cl. 112—63)

1

This invention relates to a machine for manufacturing various kinds of materials and fabrics into tubing and for cutting the same to produce a continuous bias strip. The invention is directed particularly to a means of producing helically seamed tubing from a straight web of material and in the same operation, to separate the material along a line running parallel to the axis of the tubing and at an angle to the seam thereof to produce the bias strip.

The type of fabric tubing referred to is in itself usable for making bags and many other products where a helical seam is necessary to afford greater strength in the side walls than is possible with an ordinary straight seam. The helically seamed fabric tubing produced in the present invention has further and very important uses in the manufacture of bias cut material from which bias tape is made and in the production of cross cut material, the latter comprising a strip separated from the tubing along a helical line running counter to the line of the helical seam, and being characterized by the direction of its warp which is disposed transversely of the length of the strip instead of longitudinally as in the normal lengths, or diagonally as in the bias strip.

It is then the purpose of this invention to provide an apparatus for handling a strip of material, seaming and feeding it to form a helical wound tubing, while it is being rotated and moved longitudinally along a mandrel, and finally winding it into a roll.

A further object of the invention is to produce helically seamed fabric tubing and to separate such tubing along a line, which is parallel to the axis of the tubing, thereby creating a bias strip which is of a width equal to the circumference of the tubing.

The objects of the invention are accomplished by means of a machine, one embodiment thereof being described in the following specification, set forth in the appended claims and illustratively exemplified in the accompanying drawing in which:

Figure 1 is a perspective view of the complete machine showing a length of material in the process of being converted from a straight length into a helical seamed fabric tubing and having a cutting blade for separating the tubing into a bias strip;

Figure 2 is a substantially longitudinal sectional view of the mandrel, pressure roll, seaming means, and revolving take-up roll for the tubing or bias cut strip;

2

Figure 3 is a plan view of the means used to separate the tubing into bias cut strip;

Figure 4 is a detail view showing a means whereby feed and pressure rolls are supported and operated to aid in guiding and moving the tubing spirally over and along the mandrel towards the take-up roller.

Referring to the drawing, 10 denotes a bullet shaped head portion constituting a substantially horizontally disposed mandrel. The head 10 is carried preferably on the outer end of a shaft or axle 11, which may be a stationary unit or capable of moving in a bearing 12 supported upon an upright block 13 rearwardly of the machine.

The straight web of material A is brought in above the mandrel and is given the proper angle with respect to the latter by breaking over a radially adjustable upper bar 14 and then, dropping to a radially adjustable lower bar 15, it breaks again and projects towards the uppermost tangent of the mandrel. The material breaks a third time over a bar 16, which is stationary. The bar 16 is not attached to the head 10 because of the desirability of allowing the mandrel to turn if required. The angle at which the web of material feeds to the seaming means allows the web to follow a helical line as the rear side of the web of the first coil joins the near side of the oncoming web at the seaming means and therefrom the tubing is guided and fed along the mandrel.

Any means may be used to secure the seam formed by the meeting of the two sides of the material, but for purposes of illustration a seaming machine is shown. The sewing machine is preferably of the so called "off the arm" type which means that it seams and feeds axially of the head instead of transversely as in the usual type of seaming machine. The seaming machine in the present instance is a sewing machine of the cylinder design and comprises a cylinder arm 17 which projects angularly towards the mandrel at the angle of the seam to be made and its end portion is disposed at the meeting point of the two sides of the web. The outer end of the break bar 16 is fixed in the cylinder 17 adjacent its free end or it may be conveniently supported so that the web moving towards the seaming means is supported right up to the point where the sewing takes place. The sewing machine head or overhead arm 18 is supported directly over the cylinder arm 17 and carries the needle and needle bar 19 and presser foot 20 operating upon the adjacent sides of the web forming the seam. To insure proper operation of the seaming attachment and to provide means to rotate the tubing following the seaming operation as it is guided and fed over the mandrel, a feed and pressure roller attachment 21 is provided, which comprises a bracket supported by and disposed beyond the free end of the cylinder arm 17, the feed roller being driven by a pair of miter gears 22 operated from a shaft 23 at the side of the cylinder arm through a pulley and belt connection 24 with the fly wheel 25 of the overhead arm 18. The seaming machine is driven through a series of shafts and gears 26 receiving their rotary movement from a remote part of the machine. The feed and pressure rollers 21 advance the helically seamed material toward and over the mandrel 10.

Up to this point we have described a machine which will handle and seam a web of material into a tube in such a manner that it is guided and fed about a mandrel. The tubing emerges from the end of the mandrel head 10 following a forward simultaneous rotary and axial movement.

In order to handle the tubing issuing from the mandrel head and wind it onto a roll without twisting the material, the leading end thereof, see Figure 2, is flattened by passing it between two pairs of spaced rods 27 arranged transversely of the axis of the tubing and supported between the outer ends of a U-shaped cradle 28 and starting it upon a core or drum 29 which turns frictionally with a shaft or spindle 29' removably journalled in the side arms of the cradle. The closed end of the cradle 28 is fixed to the end of a shaft 30, which is axially alined with the mandrel 10 and journalled in bearings 31 on upright spaced standards 32. The shaft 30 is rotated through intermeshing gears 33 and 34, the latter being on a shaft 35 having a pulley 36 at one end and being journalled in bearings 37 also mounted on frames or standards 32. A belt 38 drives pulley 36 from pulley 39 on main drive shaft 40, coupled to motor 41 at one end and geared to gear and shaft connection 26 at opposite end adjacent the seaming machine.

The drum 29 is rotated in the cradle 28 to wind up the tubular material B passing through the bars 27, by means of a belt 42 driven from a pulley 43 on shaft 30 between the bearing 31 and the cradle 28 and turning a pulley 44 on a short shaft 45 supported in a bracket 46 on the side arm of the cradle, the shaft 45 and drum shaft 29' being connected by a pair of miter gears 47. The gear and belt and pulley ratios and the frictional engagement of the drum and shaft 29' of the take up mechanism are calculated to allow operation of the cradle and drum at a speed which will handle the helical seamed tubing being formed by the seaming machine.

A complete operation of the tube manufacturing machine includes the angular feed of the web of the material to the seaming machine, which secures the sides of the web and forms a helical seam, thereby producing a tubing which is turning about its axis as it is fed and moves over the mandrel by and towards the take up mechanism. The take up is operated to revolve about the axis of the mandrel and the tubing is flattened as it enters the take up and winds upon a drum rotating about an axis at right angles to the axis of rotation of the tubing and take up. As a result the drum contains a roll of helical seamed tubing which may be used as such or further processed as hereinafter described to produce a bias strip or a cross cut strip.

A bias strip may be produced on the present device, as illustrated in Figures 2 and 3, wherein one or both arms of the cradle 28 carry a knife blade 48, disposed preferably between the upper and lower sets of rods 27, and adapted to project into the tubing between the layers thereof formed by flattening the same. As the tubing is moved between the rods 27 the wall will be separated along a line running axially of the tubing and diagonally of the helical seam. After the run onto the drum 29 is complete the latter is removed and the material is unwound and spread out flat for rewinding into what is known as a bias roll. If only one knife is used at one side of the cradle the bias strip resulting from the cutting operation will be equal to the entire circumference of the tubing. This is particularly desirable from a commercial standpoint, because the wider the rolled strip the greater the number of sections of bias tape which may be produced for each operation. On the other hand, if narrow bias strips are required the use of two blades, one on each arm of the cradle, will separate the tube at opposite flattened sides and two strips each one half the circumference of the tubing will result.

A cross cut strip may be produced from the helical seamed tubing by running it through any of the well known bias cutting devices in a direction which brings the line of separations at substantially right angles to the line of the helical seam so that one set of material threads or fibers run longitudinally in the strip and is crossed at right angles by a transverse set of threads running from one side to the other side of the strip.

It is further contemplated that applicants may substitute for the seaming machine, any means for forming a seam, as for example medium or means to either bind, tape, fuse or join the material when subjected to heat or chemical reaction or hot knife cutting and joins together the sides of the web to form a tubing.

Experience reveals that the adjacent and opposite sides of the web may be joined either in overlapped arrangement or as abutting elements, by simply adjusting the angle of the breaking bars 14 and 15 with respect to the axis of the mandrel.

Having now described the invention and the manner in which the same is operated, what we claim and desire to secure by Letters Patent is:

1. In a tube forming machine, a source of web material, a seaming means, a material feeding means, a mandrel and a rotatable tube takeup means, the feeding means being positioned at one side of and in advance of the receiving end of the mandrel, the mandrel being positioned wholly at one side of said seaming means and feeding means and directly in the path of the material as it leaves the feeding means, and lying directly between said seaming means and the takeup means, said feeding means supplying said web to said mandrel as a spirally moving tube, the material moving freely over said mandrel, said takeup means taking up said spirally moving tube directly from said mandrel without twisting the same.

2. In a tube-forming machine, a source of web material, a seaming means, a material feeding means, a mandrel and a rotatable tube takeup means, the feeding means being positioned at one side of and in advance of the material receiving end of the mandrel, the mandrel being freely rotatable independently of the speed of the takeup means, said feeding means supplying said web to said mandrel as a spirally moving tube, the material moving freely over said mandrel, said takeup means rotating in synchronization with the speed of the feed of said material, whereby said spiralling tube is taken up directly from said mandrel without twisting the same.

3. In a tube forming machine, a source of web material, a seaming means, a material feeding means, a mandrel and a rotatable tube takeup means, the feeding means being carried by the seaming means and lying in the path of the moving material between the seaming means and the mandrel, the mandrel being positioned adjacent to and at one side of said seaming and material feeding means, and in the path of the material as it leaves the feeding means, the material passing through the seaming means in a direct line to the feeding means and being doubled back upon itself beneath the feeding means and over the mandrel in a spiral, the mandrel lying directly between said machine and the takeup means, the material moving freely and spirally over said mandrel directly to said takeup means where it is taken up without twisting the same.

4. In a tube forming machine, a source of web material supply, a seaming means, guide means for delivering the web material to said seaming means at an angle to bring the opposite edges of the material together for seaming, a feeding device comprising a feeding roller and a presser roller carried by said seaming means in the path of the seamed material, drive means for said feeding roller comprising a take-off from the drive for the seaming means whereby the speed of the feed of the material is synchronized with the speed of the seaming means, a mandrel positioned adjacent to and at one side of said seaming and feeding means and lying in the direction of movement of the material leaving said seaming and feeding means, said mandrel receiving said material in tubular form after the seaming operation, tube takeup means positioned substantially in the horizontal plane of the mandrel axis and rotatable at the speed of rotation of said tubular material, thereby taking up said tubular material from said mandrel without twisting the same.

5. In a tube forming machine, a source of web material supply, a seaming means, guide means for delivering the web material supply to said seaming means at an angle to bring opposite edges of said material together for seaming, a mandrel positioned adjacent said seaming means and being freely rotatable on its axis in response to the movement of the seamed material thereover, said seaming means feeding said material to said mandrel, said mandrel receiving said material in tubular form directly from the seaming means, and tube takeup means, rotatable at the speed of rotation of said tubular material over said mandrel to take up said material without twisting.

JULIUS KATZ.
FRANK P. MAJOROS.

REFERENCES CITED

The following references are of record in the file of this patent:

UNITED STATES PATENTS

| Number | Name | Date |
| --- | --- | --- |
| 1,967,486 | Vennewitz | July 24, 1934 |
| 1,828,554 | Bunker | Oct. 20, 1931 |
| 2,260,816 | Albin | Oct. 28, 1941 |
| 324,155 | Parsons | Aug. 11, 1885 |
| 2,322,030 | Kressler | June 15, 1943 |
| 2,197,043 | Guyler et al. | Apr. 16, 1940 |
| 1,382,579 | Wandel | June 21, 1921 |
| 1,067,161 | Berg | July 8, 1913 |
| 2,301,092 | Thompson et al. | Nov. 3, 1942 |
| 2,340,290 | West | Feb. 1, 1944 |
| 2,048,360 | Spanel et al. | July 21, 1936 |
| 2,051,922 | Vogt | Aug. 25, 1936 |